United States Patent
Brahmi et al.

(10) Patent No.: US 12,304,835 B2
(45) Date of Patent: May 20, 2025

(54) WATER TREATMENT APPARATUS

(71) Applicant: Solable SAS, Lambesc (FR)

(72) Inventors: Saadi Brahmi, Lambesc (FR); Pascal Nuti, Meyreuil (FR)

(73) Assignee: Solable SAS, Lambesc (FR)

( * ) Notice: Subject to any disclaimer, the term of this patent is extended or adjusted under 35 U.S.C. 154(b) by 538 days.

(21) Appl. No.: 16/640,356

(22) PCT Filed: Aug. 23, 2018

(86) PCT No.: PCT/EP2018/072827
§ 371 (c)(1),
(2) Date: Feb. 20, 2020

(87) PCT Pub. No.: WO2019/042870
PCT Pub. Date: Mar. 7, 2019

(65) Prior Publication Data
US 2020/0172412 A1    Jun. 4, 2020

(30) Foreign Application Priority Data

Aug. 31, 2017   (FR) ...................................... 1700885

(51) Int. Cl.
*C02F 1/32* (2023.01)
*C02F 1/02* (2023.01)
(Continued)

(52) U.S. Cl.
CPC ............... *C02F 1/325* (2013.01); *C02F 1/02* (2013.01); *C02F 1/725* (2013.01);
(Continued)

(58) Field of Classification Search
CPC ...... C02F 1/72; C02F 1/78; C02F 1/48; C02F 1/46; C02F 1/32; C02F 1/325; C02F 1/02;
(Continued)

(56) References Cited

U.S. PATENT DOCUMENTS

| 4,372,860 A | * | 2/1983 | Kaas | ........................ C02F 1/325 |
|---|---|---|---|---|
| | | | | 210/748.11 |
| 5,628,897 A | * | 5/1997 | Phelan | ....................... C02F 1/02 |
| | | | | 210/473 |

(Continued)

FOREIGN PATENT DOCUMENTS

| CN | 101374768 A | * | 2/2009 | ............ C02F 1/5236 |
|---|---|---|---|---|
| CN | 102701319 A | | 10/2012 | |

(Continued)

OTHER PUBLICATIONS

English translation of CN-204670595-U; Li, Yun-shui; (Year: 2015).*

(Continued)

*Primary Examiner* — Joseph W Drodge
(74) *Attorney, Agent, or Firm* — BelayIP

(57) ABSTRACT

A chlorinated water treatment apparatus is disclosed, the apparatus including a tank arranged to receive a predetermined volume of chlorinated water to be treated, wherein the treatment apparatus includes at least one light source arranged to expose the predetermined volume to an ultraviolet radiation of a wavelength within a range from 325 nm to 395 nm.

1 Claim, 1 Drawing Sheet

(51) Int. Cl.
*C02F 1/72* (2023.01)
*C02F 101/12* (2006.01)

(52) U.S. Cl.
CPC .... *C02F 2101/12* (2013.01); *C02F 2201/007* (2013.01); *C02F 2201/3222* (2013.01); *C02F 2201/3227* (2013.01); *C02F 2209/02* (2013.01); *C02F 2303/02* (2013.01)

(58) Field of Classification Search
CPC .................. C02F 1/725; C02F 2101/12; C02F 2201/007; C02F 2201/3222; C02F 2201/3227; C02F 2209/02; C02F 2303/02; C02F 2303/185; C02F 2201/32; C02F 2201/326; B01D 32/34; B01D 61/10; B01D 61/08

See application file for complete search history.

(56) References Cited

U.S. PATENT DOCUMENTS

| | | | |
|---|---|---|---|
| 2002/0103409 A1* | 8/2002 | Kuriyama | A62D 3/17 |
| 2008/0104978 A1* | 5/2008 | Kim | B01D 5/0039 210/141 |
| 2010/0294727 A1* | 11/2010 | Gilbeau | C02F 1/722 210/756 |
| 2015/0053624 A1* | 2/2015 | Maiden | C02F 1/002 210/748.11 |
| 2015/0209457 A1* | 7/2015 | Bonutti | C02F 1/325 250/435 |
| 2016/0083271 A1* | 3/2016 | Chen | A61L 2/10 250/432 R |
| 2016/0251238 A1* | 9/2016 | Matlack | A61L 2/10 250/372 |
| 2016/0271280 A1* | 9/2016 | Liao | A61L 2/10 |

FOREIGN PATENT DOCUMENTS

| | | | | |
|---|---|---|---|---|
| CN | 204670595 U | * | 9/2015 | |
| DE | 10 2010 005893 A1 | | 7/2011 | |
| JP | 54104690 | | 8/1954 | |
| JP | 52036063 A | | 9/1975 | |
| JP | 52038063 A | | 9/1975 | |
| JP | H09940 A | * | 1/1997 | ............ B01J 35/02 |
| JP | 2004073312 A | * | 3/2004 | |
| JP | 2005-74337 | | 3/2005 | |
| JP | 2014121669 A | | 12/2012 | |
| JP | 2014198292 A | * | 10/2014 | |
| JP | 2017051887 A | | 2/2017 | |
| JP | 2017 051887 | | 3/2017 | |
| KR | 20150061337 A | * | 6/2015 | |
| WO | WO-9737936 A1 | * | 10/1997 | ............ B01J 19/123 |
| WO | WO2008156813 A1 | | 12/2008 | |
| WO | WO 2011067015 A2 | | 5/2011 | |
| WO | WO-2012114027 A1 | * | 8/2012 | ............ B01D 53/76 |
| WO | WO-2015031446 A1 | * | 3/2015 | ............ C02F 1/325 |
| WO | WO 2016/108459 | | 12/2015 | |
| WO | WO2016/016603 A1 | | 2/2016 | |

OTHER PUBLICATIONS

KR-20150061337-A-Translation (Year: 2015).*
JP 2004073312 A (Year: 2004).*
English translation of Patent Publication WO 2012114027, published Aug. 30, 2012 (Year: 2012).*
Machine Language Translation of JPH09940.
Written Opinion for FR11700885, Priority Document of WO2019/042870A1.
Search Report for FR11700885, Priority Document of WO2019/042870A1.
English Langauge Translation of DE 10 2010 005893 A1.
English Langauge Translation of JP 2017 051887.
CN102701319A English Language Translation.
Machine Transitions Into English of JP2005-74337.
Machine Transitions Into English of JP2014121669A.
Machine Transitions Into English of JP2017051887A.
Machine Transitions Into English of JP52038053A.
Machine Translations Into English of JP54104690.
Machine Translations Into English of JP2005-74337.
Machine Translations Into English of JP2014121669A.
Machine Translations Into English of JP2017051887A.
Machine Translations Into English of JP52038063A.

* cited by examiner

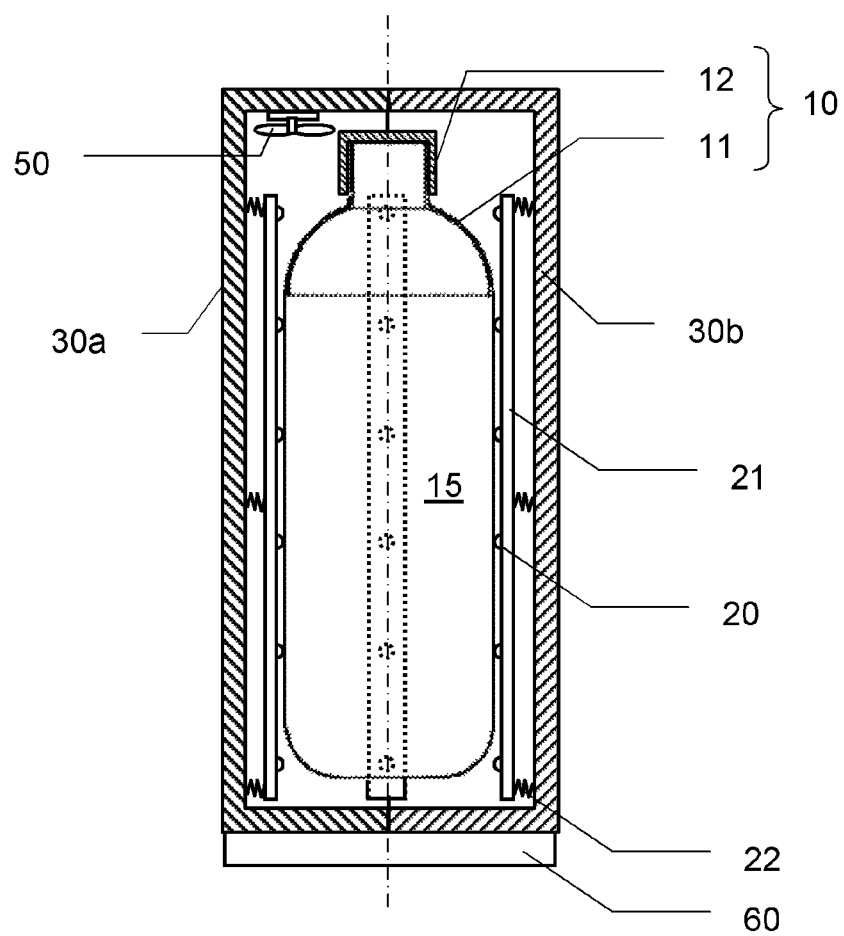

WATER TREATMENT APPARATUS

CROSS REFERENCE TO RELATED APPLICATIONS

This application is a national phase of International Application No. PCT/EP2018/072827, filed on 23 Aug. 2018, which claims priority to French Patent Application FR1700885 filed on Aug. 31, 2017. The contents of the above-referenced applications are expressly incorporated herein by reference to their entireties.

FIELD

The present invention generally relates to a water treatment apparatus, and particularly to a chlorinated water treatment apparatus.

The drinking water market is largely dominated by chlorine treatments, the only ones to combine discount prices and sufficient disinfection remanence to cope with the long distribution networks. In some countries (for example in the USA), the chlorine levels allowed in water are very high (0.8 mg/l compared to 0.4 mg/l in Europe), of the order of 1 mg/l in the water distributed to the network.

BACKGROUND

Chlorine has several disadvantages, including the creation of dangerous by-products (chloramines (chemical compounds characterized by the —N—Cl group), Trihalomethane, chloroform, etc.), and these chlorine treatments have another disadvantage: if chlorine does not smell good, its taste remains limited, the chloramines are very odorous and induce a strong (and very unpleasant) taste, which does not disappear after one hour of venting. Contrary to some misconceptions, water that contains chloramines can require at least 24 hours of aeration for a partial reduction, which would leave room for microbial recolonization in case of practice.

Treatment devices are known in the prior art, such as filter jugs, but as seen above, the water should be allowed to stagnate therein for a long time, which can cause bacterial contaminations, and moreover, such filter jugs can retain mineral salts or trace elements which are nevertheless beneficial for the consumer.

Solutions based on reverse osmosis create near-distilled water, which lacks essential mineral salts, and are moreover energy-consuming and require more consumables than filter jugs.

Ultrafiltration and microfiltration are ineffective on dissolved chlorine, as well as on its derivatives.

Finally, Ultraviolet (UV-C) purifiers are effective on bacteria, and are capable, to a certain extent, of reducing chlorine (subject to a UV-C dose twenty times greater . . . ). These apparatuses are subject to an annual lamp change (which lamp should not be turned off in order to be preserved . . . ), and their wavelength, effective on chlorine, is less effective on chloramines. Disposable lamps extensively use mercury, which has an additional disadvantage.

SUMMARY

An object of the present invention is to address the disadvantages of the documents of the prior art mentioned above and particularly, first of all, to propose a simple apparatus for treating the chlorinated water, which has no effect on the trace elements, and which can quickly treat a volume of water to be consumed to remove the unpleasant taste of chlorine and its derivatives therefrom.

For this purpose, a first aspect of the invention relates to a chlorinated water treatment apparatus, comprising a tank, arranged to receive a predetermined volume of chlorinated water to be treated, characterized in that the treatment apparatus comprises at least one light source arranged to irradiate the predetermined volume with an ultraviolet radiation of a wavelength comprised within a range from 320 nm to 400 nm and preferably from 325 nm to 395 nm. Such a treatment apparatus is simple to manufacture, and allows rapid and effective treatment of the predetermined volume to remove the taste of chlorine from the chlorinated water initially introduced into the tank which is closed during the treatment. Said at least one light source is arranged to generate A-type ultraviolet rays, that is to say whose wavelength is comprised between 320 nm (nanometers) and 400 nm (nanometers) and preferably between 325 nm and 395 nm. The general architecture of the apparatus is simple: a tank (removable or not), and light sources are sufficient to expose the content of the tank to UV rays (A type).

Particularly, the apparatus is devoid of filter, filter or micro-filter cartridge. The trace elements are therefore not retained by such a filter.

Particularly, the apparatus is devoid of separate ozone generation and circulation means, for circulating ozone gas in the tank.

In other words, the basic operation of the apparatus is only intended to expose the water to an ultraviolet radiation. Thus, the exposure to ultraviolet rays makes the chlorine odor disappear. The water exposure to solely ultraviolet radiation allows treating the malodorous molecules. In other words, the invention proposes an apparatus that allows making the chlorine odor disappear solely by exposing the water in a closed container with a particular UV radiation, and this therefore without filtration, without exposure to ozone, or without the use of a photocatalyst.

Particularly, chlorine in tap water is present in particular in the form of hypochlorous acid (HClO) and hypochlorite ions (ClO$^-$), and the action of the UV radiation causes a reduction of these chlorine molecules, generating free radicals:

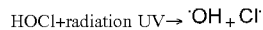

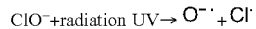

Thus, the free radicals generated can then destroy (by oxidation, or advanced oxidation process) the other molecules and any viruses or bacteria present in the solution under treatment.

Advantageously, the treatment apparatus comprises a casing and a plurality of light sources arranged in the casing to expose the predetermined volume to a light radiation of a wavelength comprised within a range from 320 nm to 400 nm and preferably from 325 nm to 395 nm, and the treatment apparatus comprises cooling means arranged to cool the light sources, and switching means arranged to switch off the cooling means so as to cause internal heating of the casing and of the predetermined volume of water. The treatment apparatus uses the heat created by the light sources to additionally pasteurize the volume of water to be treated. It can be considered to raise the volume of water to be treated to at least 57° C., or more preferably to at least 60° C. Once again, the invention proposes an apparatus that allows making the chlorine odor disappear only by exposing the water in a closed container with a particular UV radiation, and this therefore without filtration, without exposure to ozone, or without the use of a photocatalyst, but the implementation above advantageously takes advantage of the heat generated by the light sources to pasteurize the water stored in the closed container.

Alternatively, the treatment apparatus comprises a casing and a plurality of light sources arranged in the casing to expose the predetermined volume to a light radiation of a wavelength comprised within a range from 320 nm to 400 nm and preferably from 325 nm to 395 nm, and the treatment apparatus comprises ventilation means arranged to cause an air flow at the level of the light sources, and recirculation means arranged to operate the ventilation means in closed circuit or not, so as to respectively cause internal heating of the casing and of the predetermined volume of water or to cool the light sources. The treatment apparatus uses the heat created by the light sources to pasteurize the volume of water to be treated. It can be considered to raise the volume of water to be treated to at least 57° C., or more preferably to at least 60° C. Once again, the invention proposes an apparatus that allows making the chlorine odor disappear only by exposing the water in a closed container with a particular UV radiation, and this therefore without filtration, without exposure to ozone, or without the use of a photocatalyst, but the implementation above takes advantage of the heat generated by light sources to pasteurize the water stored in the closed container.

Very advantageously, said at least one light source is a light-emitting diode.

Particularly, said at least one light source is a light-emitting diode chosen to emit or generate an ultraviolet radiation of a wavelength of 365 nm±15 nm and preferably of 365 nm±10 nm.

According to one optional implementation, the treatment apparatus comprises a photocatalyst arranged to be in contact with the water to be treated.

Advantageously, the photocatalyst is a coating arranged on a wall arranged to be in contact with the water to be treated. It can be considered to coat an inner wall of the tank, or a rod secured to a tank cap and acting as a plunger.

Advantageously, the photocatalyst is titanium dioxide applied as a coating to a member in contact with the water to be treated.

Advantageously, the tank is removable.

Advantageously, the tank is transparent to ultraviolet rays of a wavelength within a range from 320 nm to 400 nm and preferably from 325 nm to 395 nm.

Advantageously, said at least one light source is a light-emitting diode comprising a light emitting head, and wherein the tank is in contact with the light emitting head. This allows transferring heat directly to the tank (to cool the light-emitting diodes, and/or to heat the water to be treated).

Advantageously, the tank is made of borosilicate glass.

Advantageously, the treatment apparatus comprises a plurality of strips arranged around the tank, each strip supporting several light sources arranged along the tank.

[Advantageously, the treatment apparatus comprises elastic means arranged to push each of the plurality of strips against the tank. This guarantees good thermal contact.

Advantageously, the treatment apparatus comprises an outer shell which is opaque to ultraviolet rays, surrounding the predetermined volume of water and said at least one light source arranged to generate the ultraviolet radiation.

Advantageously, the treatment apparatus comprises an ultraviolet ray reflecting wall, surrounding the predetermined volume of water and said at least one light source arranged to generate the ultraviolet radiation.

A second aspect of the invention relates to a chlorinated water treatment method, comprising a step consisting of exposing a predetermined volume of chlorinated water to an ultraviolet radiation of a wavelength within a range from 320 nm to 400 nm and preferably from 325 nm to 395 nm.

Advantageously, the method comprises a step consisting of heating the predetermined volume of water to a temperature at least equal to 60° C., simultaneously with the step of exposing the predetermined volume of chlorinated water to the ultraviolet radiation.

Advantageously, the heating heat is generated by the light sources that generate the ultraviolet radiation. According to a particularly interesting implementation, there are no heating means other than the light sources that generate the ultraviolet radiation.

Advantageously, the method comprises a step consisting of exposing the predetermined volume of water to a photocatalyst, simultaneously with the step of exposing the predetermined volume of chlorinated water to the ultraviolet radiation.

Advantageously, the step of exposing the predetermined volume to the ultraviolet radiation is carried out long enough to provide at least 5.5 Wh of light energy per liter of water to be treated.

In other words, the invention relates to the use of the treatment apparatus according to the first aspect, or to the use of the treatment method according to the second aspect, for treating chlorine or its derivatives present in chlorinated water. This chlorinated water contains little or no microbes or bacteria (and therefore must not be disinfected again before being consumed), but has an unpleasant odor or taste, that the treatment apparatus or the treatment method can eliminate in a short time. Indeed, the Applicant has noticed that an exposure to A-type UV radiation allows eliminating the taste or odor of chlorine. The odorous molecules (chlorine, active chlorine, and especially chloramines . . . ) are broken to generate free radicals and then ions that do not have the characteristic odor of chlorine.

BRIEF SUMMARY OF THE DRAWINGS

Other characteristics and advantages of the present invention will become more apparent upon reading the following detailed description of one embodiment of the invention given by way of non-limiting example and illustrated by the appended drawing, in which:

FIG. 1 represents a sectional view of a water treatment apparatus according to the invention.

DETAILED DESCRIPTION

FIG. 1 represents a sectional view of a chlorinated water treatment apparatus, which comprises a casing 30 (here formed by two half-casings 30a and 30b), a tank 10 formed by a bottle 11 and a cap 12, so as to form a closed volume, a plurality of light-emitting diodes 20 embedded on strips 21.

The light-emitting diodes 20 are arranged to emit a light signal in the ultraviolet range, and particularly the light-emitting diodes 20 are provided to emit A-type ultraviolet rays (otherwise called UV-A). The light-emitting diodes 20 are therefore arranged to emit a light signal whose wavelength is within a range from 320 nm to 400 nm and preferably from 325 nm to 395 nm.

The casing can accommodate on a temporary basis the tank 10 containing chlorinated water 15 (it suffices to separate the two half-casings 30a and 30b). As shown in FIG. 1, the light-emitting diodes 20 are in contact with the tank 10 because springs 22 push the strips 21 and the light-emitting diodes 20 towards the tank 10. This makes it possible to cause heat conduction from the light-emitting diodes 20 to the tank 10.

The treatment apparatus also comprises ventilation means 50 that cause an air flow in the closed enclosure. It can be provided to operate the ventilation means 50 in an open circuit (to cool the light-emitting diodes 20) or in a closed circuit (to heat the tank 10 and the water 15). It can also be provided to turn off the ventilation means 50 in order to heat the tank 10 and the water 15, and to turn them on in order to cool the light-emitting diodes 20.

Finally, the treatment apparatus comprises an electrical control unit 60 for driving the light-emitting diodes 20, the ventilation means 50 according to the treatment cycle. An external mains power supply or a battery can be provided to get a mobile apparatus.

Through another series of tests, the Applicant established that the wavelength useful for this work is comprised between 320 nm and 400 nm and preferably between 325 nm and 390 nm. Thus, for a 1 l bottle, representing about 600 cm$^2$ of unrolled surface, a received amount of UV-A of about 5.5 Wh, i.e. the equivalent of two hours of full sun is required.

By manufacturing a box, and placing a series of light-emitting diodes 20 around the bottle 11 placed inside, it is possible to use a power which is for example four times greater (11 W) to manage to treat this same liter of water in 30 minutes.

But the effect does not stop at removing chlorine and its derivatives: it generates a lot of hydroxyl radicals, H2O2, O3, which thus conduct a sterilization of the water by a threefold advanced oxidation process (only one of these methods would alone sterilize the content without difficulty.

Moreover, the apparatus advantageously uses a property of the UVA radiation which is germicidal, thus making it possible to accelerate the treatment with a significant reduction, but also to stabilize the result by a protective irradiation, for example once a day.

Moreover, this solution has the advantage of proposing the sterilization of the content and of the container at each cycle, as well as working in noble materials such as tempered glass or quartz (both UV-A transparent).

The fact of using light-emitting diodes 20 allows achieving about 50% of light output (i.e. a consumption of about 12 Wh per liter treated) and not worrying about the annual lamp change, the lifetimes of the light-emitting diodes 20 are in the order of 50,000 hours and these withstand the repetitive ignition cycles without being affected, there is therefore no consumable to provide, nor any particular maintenance, the bottle 11 being sterilized at each cycle.

One of the possibilities of carrying out the invention is the use of a bottle made of tempered borosilicate glass and the use of a box opening in the middle. Several rows of light-emitting diodes 20 can be disposed (four in the implementation of FIG. 1, but 6 or 8 strips 21 can be provided) with preferably regular angular spacings, preferably disposed so that the upper globe of each light-emitting diode 20 is in contact with the outside of the glass, thus serving as a support on the low rows.

This innovative disposition is preferable because it allows, without power loss, reaching with the UV-A beam the middle of the container, thus allowing a well-distributed disinfection.

But it has other advantages: the body of the bottle (i.e. the glass and the water) will thus serve as a heat buffer stock (50% minimum heat to dissipate), the glass performing the cooling of the set of the light-emitting diodes 20 with a single side fan (the ventilation means 50). The efficiency of the light-emitting diodes 20 will be consequently significant, and their lifetime will be preserved.

However, this disposition also allows treating the content of the bottle by pasteurization. Indeed, by stopping the side fan, the loss of efficiency of the light-emitting diodes 20 will be used to reach a temperature of 60° C. which, in the absence of chlorine in the input water, will guarantee total elimination of the viruses and bacteria. The powers and efficiency of the light-emitting diodes 20 should of course be adapted, for this option, to promote the rise in temperature. A heat insulating box can be provided to limit losses towards the outside, and/or recirculation means (a flap facing the outside) can be provided to allow operation in closed or open circuit.

It is also possible to provide a shield reflecting the UV-A (between the body of the casing and the light-emitting diodes 20+the bottle 11) in order to concentrate the exposure to UV-A on the water 15.

According to one optional implementation, the apparatus can treat the water by photocatalyst, on simple condition that a treatment is carried out, for example a titanium dioxide coating (nanometric TIO$_2$ crystal), disposed on the internal face of the bottle 11 made of borosilicate or quartz tempered glass.

Another embodiment is to manufacture a plate covered with light-emitting diodes, in the format of a tempered glass jug, and place the jug on top during treatment. Indeed, water has a natural capacity to behave like an optical fiber, allowing light to follow its path. According to this implementation, it appears that only ultraviolet radiation allows making the chlorine taste of the water disappear, there is no filter, no ozone circulation, no photocatalyst.

A larger machine can be manufactured, connected to the network, with a single or double tank to allow uninterrupted operation. There is in fact no size limit, because it is also possible to use UV-A transparent food plastic (for example Polymethyl methacrylate (PMMA), High density polyethylene (HDPE), Polyethylene terephthalate (PET) . . . ). It is thus possible to manufacture terminals for cities, or under-sink tanks.

It will be understood that various modifications and/or improvements that are obvious to those skilled in the art can be made to the various embodiments of the invention described in the present description without departing from the scope of the invention defined by the appended claims. Particularly, reference is made to a casing in two longitudinal parts, but it is possible to provide a casing that opens on one end to slide the bottle 11 into a cylindrical treatment chamber.

In addition, the apparatus can also be placed horizontally or vertically to treat the water 15.

What is claimed is:

1. A method for treating, in an apparatus free of a filter, chlorinated drinking water to be consumed by a user, the method comprising the steps of:
    exposing a predetermined closed volume of the chlorinated drinking water only to an ultraviolet radiation of a wavelength within a range from 350 nm to 380 nm, wherein the ultraviolet radiation breaks chlorinated molecules in the chlorinated drinking water; and wherein the step of exposing a predetermined volume to the ultraviolet radiation is carried out long enough to provide at least 5.5 Wh of light energy per liter of drinking water.

\* \* \* \* \*